United States Patent [19]

Gair

[11] 4,154,544
[45] May 15, 1979

[54] PIVOT JOINT

[75] Inventor: Albert W. Gair, Fraser, Mich.

[73] Assignee: TRW Inc., Cleveland, Ohio

[21] Appl. No.: 846,683

[22] Filed: Oct. 31, 1977

[51] Int. Cl.$^2$ ............................................... B42F 3/00
[52] U.S. Cl. ...................................... 403/59; 403/131; 403/133
[58] Field of Search ............... 403/112, 122, 131, 133, 403/161, 135, 140, 123, 128, 129, 130, 53, 76, 59

[56] References Cited

U.S. PATENT DOCUMENTS

| | | | |
|---|---|---|---|
| 1,919,797 | 7/1933 | Maurer | 403/131 |
| 3,175,834 | 3/1965 | Wallace et al. | 403/140 X |
| 3,352,583 | 11/1967 | Patton | 403/161 |

FOREIGN PATENT DOCUMENTS

| | | | |
|---|---|---|---|
| 205152 | 1/1957 | Australia | 403/131 |
| 987323 | 3/1965 | United Kingdom | 403/131 |

*Primary Examiner*—Wayne L. Shedd

[57] ABSTRACT

A joint assembly is connected between two relatively movable spaced parts. The joint assembly comprises a housing and a stud to be connected to the parts. The stud is supported for rotation about its own axis relative to said housing, for free axial movement relative to said housing, and for universal pivotal movement about a point on its axis relative to said housing. A spherical bearing in a chamber in the housing has a central passage through which said stud extends. The passage in the bearing is defined by an inner surface which conforms to and engages the outer surface of the stud. A stop portion on the stud engages the bearing to limit movement of the stud axially in a direction tending to separate the stud and housing. The stud is freely movable in an unrestrained manner axially relative to the bearing between a first position in which the stop engages the bearing and a second position spaced from said bearing. Means is provided for holding the bearing against axial movement relative to the housing.

12 Claims, 4 Drawing Figures

PIVOT JOINT

BACKGROUND AND SUMMARY OF THE INVENTION

The present invention relates to a joint assembly and particularly to a joint assembly which is to be connected between two relatively movable spaced parts. Such joint assemblies may be used in different structures. Preferably, the joint assembly is used in a suspension for a vehicle to interconnect different parts of the suspension system.

More specifically, the present invention is directed to a joint assembly which includes a socket housing and a stud which are in assembled relation and which are to be connected between two relatively movable parts. The joint assembly is constructed so that the stud can rotate about its own axis, can move longitudinally relative to the socket housing, and can pivot universally about a center lying on the axis of the stud.

The stud of the present invention is completely free to move axially with respect to the socket housing. There are no biasing springs or the like which must be overcome in order for the stud to move relative to the socket housing. As a result, the joint assembly may be readily assembled between relatively movable parts. Specifically, the distance between certain parts may be different than the distance between other parts. Thus, the length of the pivot joint may have to vary to compensate for the differing distance between the parts. In the present joint this may be accomplished without the necessity of overcoming any spring acting on the stud.

Further, the present invention minimizes sideloads on the stud which in turn act on the bearing which supports the stud. Sideloads are minimized because the bearing which supports the stud can pivot universally relative to the socket housing. Thus any sideloads due to stud misalignment with respect to the socket housing are readily compensated for by a pivoting action of the bearing relative to the socket housing and, of course, pivoting action of the stud relative to the socket housing.

The specific construction of the present invention involves a stud which extends through a central passage in a bearing. The bearing is located in the socket housing. The bearing has spherical surfaces which engage spherical surfaces in the socket housing. Accordingly, universal pivoting movement of the stud relative to the housing can occur about a center which lies on the axis of the stud. Further, the stud on one end thereof has a stop surface which engages the bearing to limit axial movement of the stud in one direction relative to the socket housing. The spherical bearing is trapped in the housing and cannot move axially therein.

BRIEF DESCRIPTION OF THE DRAWINGS

Further advantages and features of the present invention will become apparent to those skilled in the art to which it relates from the following detailed description of a preferred embodiment thereof made with reference to the accompanying drawings in which.

DETAILED DESCRIPTION OF THE PREFERRED EMBODIMENT

As noted above the present invention relates to a joint assembly which is adapted to be connected between two relatively movable spaced parts. In particular the present invention relates to a joint assembly which includes a stud and a socket housing in which the stud is supported. The stud is supported for free longitudinal movement relative to the socket housing as well as rotational movement relative to the socket housing about its own axis. Further the stud is supported for universal pivotal movement relative to the socket housing.

Figure 1:
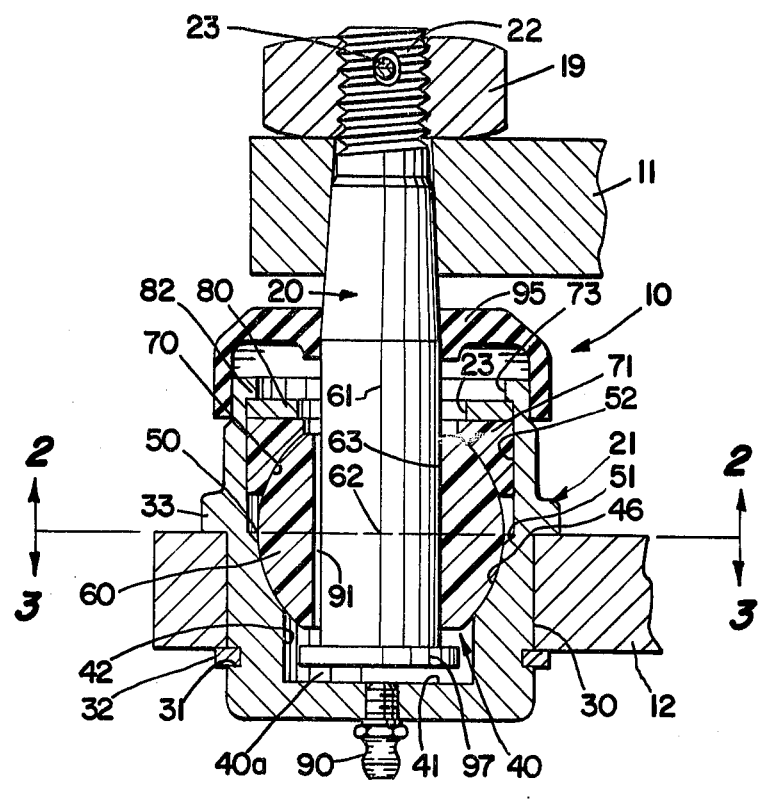
FIGS. 1 and 4 are sectional views of a joint assembly embodying the present invention and shown interconnected between two relatively movable spaced parts.

As representative of the present invention a joint assembly generally designated 10 is shown in FIG. 1. The joint assembly 10 is adapted to be connected between two relatively movable parts 11 and 12. The relatively movable parts may be any parts. However, the joint assembly 10 is commonly used to connect portions of a suspension system of a vehicle, and thus parts 11, 12 are portions of a suspension system of a vehicle.

The joint assembly includes a stud member 20 and a socket housing member 21. The stud member 20 includes means 22 for attaching the stud member to the part 11. The means 22 for attaching the stud member to the part 11 comprises a threaded portion on the outer end of the stud member 20 which projects beyond the housing member 21 and a nut 19. The stud member is provided with an opening 23 for receipt of a cotter pin which may extend through the outer tip of the stud member 20 and through part of the nut 19.

The socket housing 21 includes a cylindrical surface portion 30 which is adapted to be received in an opening in part 12. A groove 31 is formed in the outer periphery of the socket housing 21 and is adapted to receive a snap ring 32 for holding the socket housing 21 and part 12 from relative movement. A shoulder 33 is formed on the outer periphery of the socket housing 21 and projects outwardly and rests against a surface of the part 12. The shoulder 33 and the snap ring 32 function to prevent any shifting of the socket housing 21 relative to the part 12.

The socket housing 21 defines a chamber 40. The chamber 40 at the lower end as shown in the drawings consists of a chamber portion 40a which is of generally cylindrical configuration. The chamber portion 40a is defined by a bottom surface 41. The surface 41 is a flat planar surface at the bottom of the socket housing 21. The sidewalls of the chamber portion 40a are defined by a cylindrical surface 42.

As shown in FIG. 1 the cylindrical surface 42 extends vertically from the planar bottom surface 41 and meets a toroidal surface 46 of the housing member 21. The toroidal surface 46 is a surface portion of a sphere. The toroidal surface 46 extends upwardly, as viewed in the drawings, from its intersection with the cylindrical surface 42 and terminates at a circular edge 50. At edge 50 the toroidal surface 46 is intersected by a generally radially outwardly extending surface 51 on the housing member 21. The chamber 40 is further defined by an upwardly extending cylindrical surface portion 52 which extends vertically upwardly from the surface 51.

The stud member 20 extends into the socket housing 21. Specifically, the stud member 20 extends into the chamber 40 in the socket housing 21. The chamber 40 contains a bearing 60. The bearing 60 supports the stud member 20 for axial longitudinal movement as well as for rotational movement about its own axis 61. Further the bearing member 60 supports the stud 20 for universal pivotal movement about a center 62 which lies on the axis 61 of the stud member 20.

The bearing 60 comprises a ball-type bearing which enables the universal pivotal movement of the stud member 20 to occur about the center 62. The bearing 60 has a central circular opening 63 therethrough. The inner diameter of the opening 63 is substantially equal to the outer diameter of the stud member 62. Thus, the surface defining opening 63 engages the outer surface of the stud 20.

The ball member 60 has an outer surface curvature which conforms with the curvature of the toroidal surface 46 and the bearing 60 rests on the surface 46. The upper portion of the bearing 60, as shown in FIG. 1, engages a toroidal surface 70. The toroidal surface 70 is a surface of a bearing member 71 which is located in the upper end of the housing member 21. The surfaces 70 and 46 have a common center at 62 and are, as described above, spherical surfaces. Thus, the bearing 60 pivots universally about the point 62. Also, the stud member 60 is universally pivotal about pivot point 62 relative to the socket housing 21.

The socket housing 21 has an opening 73 therethrough which is of a diameter substantially greater than the diameter of the stud member 20. The stud member 20 extends into the socket housing 21 through the opening 73. Thus, the stud member 20 may pivotally move in a universal manner without interference with the socket 21.

A washer 80 is interposed between the bearing member 71 and an upper shoulder portion 82 of the housing. The washer 80 has an opening 83 therethrough which is of a size greater than the diameter of the stud member 20 so as to not interfere with universal pivoting movement of the stud member 20. The outer periphery of the washer 80 has a diameter which conforms to the diameter of the cylindrical surface 52.

Further, in accordance with the present invention a lubricating connection 90 is provided at the lower end of the bearing. The lubricating connection 90 enables lubricant to flow into the chamber 40. The surface of the ball member defining opening 63 may be provided with grooves such as the grooves 91. Such grooves enable lubricant to flow through the bearing opening 63.

The upper end of the joint assembly 10 is provided with a boot 95. The boot 95 is made of rubber or the like and thus is flexible. The boot 95 is secured in a sealing manner around the outer periphery of the stud member 20 and is also sealingly secured to the upper end of the housing member 21. The boot being flexible does not interfere with universal pivotal movement of the stud 20.

The joint assembly of the present invention is also provided with a means which prevents or limits axial movement of the stud in a direction which tends to separate the stud member from the housing member. This means is simply a stop or projection generally designated 97 on the lower end of the stud member, as shown in the drawings. The stop 97 is in the form of a flange which projects radially outwardly of the stud 20.

The joint assembly 10 of the present invention has substantial advantages over prior known joint assemblies. The joint assembly 10 when assembled is adapted to be connected between the parts 11 and 12. The distance between parts to which the joint assembly is to be attached may vary. The joint assembly is constructed so that the length thereof may be modified to compensate for varying distances between the parts to be connected by the joint 10. Specifically, the stud 20 may be moved axially relative to the socket housing 21 in a free manner. The free movement of the stud 20 can occur due to the fact no biasing springs or the like act on the stud 20. Thus, the stud 20 does not have to move against the force of any biasing spring to compensate for any variance in the distance between the parts to be connected by the joint assembly 10.

Figure 4:
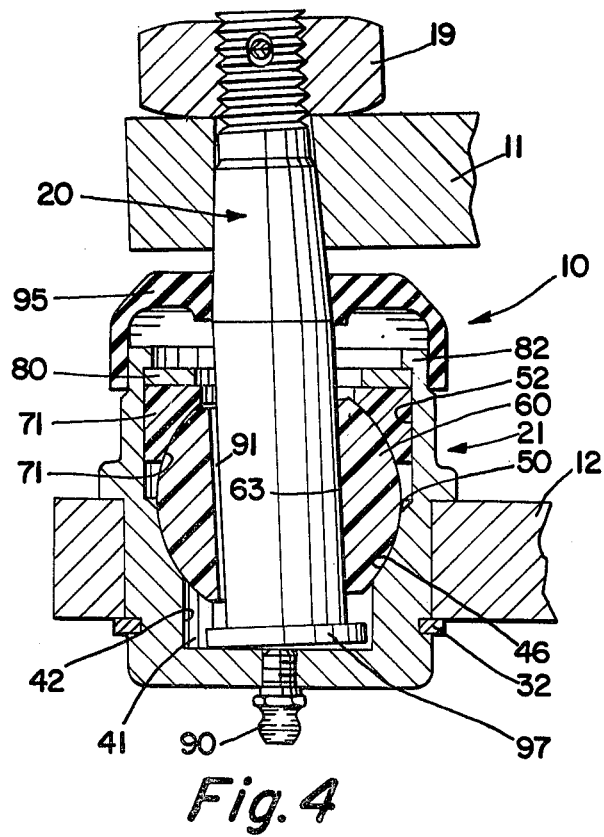
Figure 2:
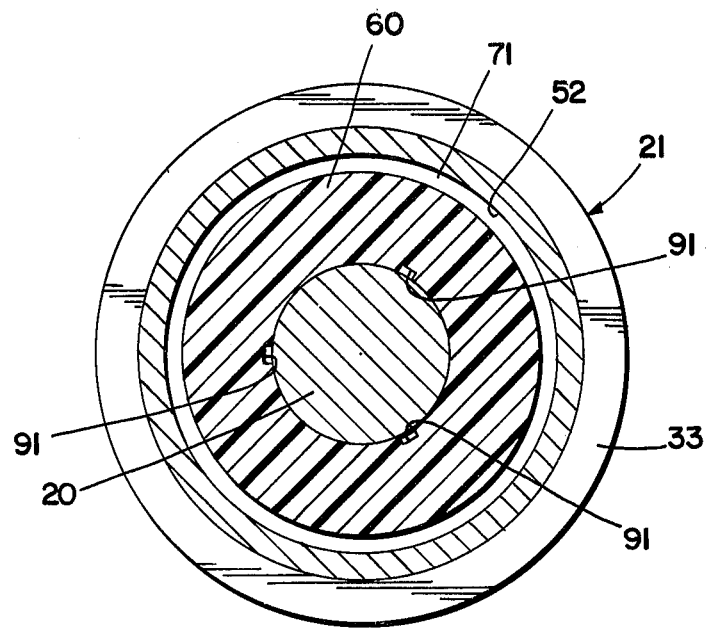
FIG. 2 is a sectional view taken approximately along the line 2—2 of FIG. 1.
Figure 3:
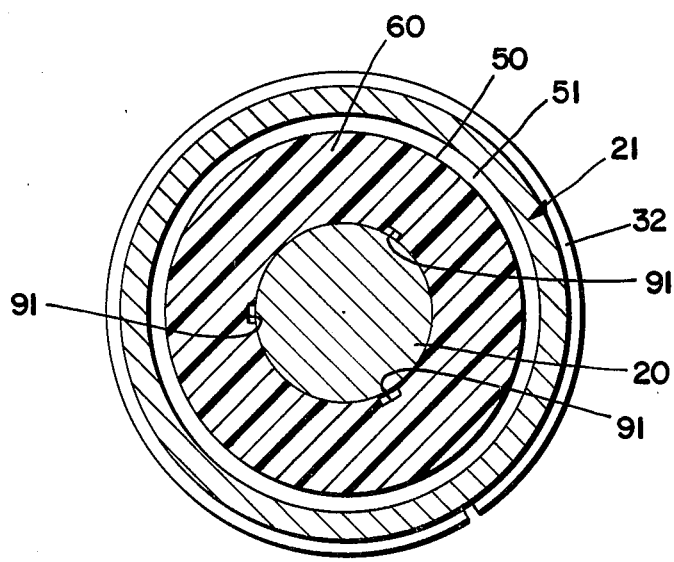
FIG. 3 is a sectional view taken approximately along the line 3—3 of FIG. 1, with the part to which the joint is connected omitted.

Further the joint assembly of the present invention is readily able to compensate for misalignment of the parts 11, 12 without undue sideloadings being applied to the joint assembly. FIG. 4 illustrates the parts 11, 12 misaligned. As should be apparent, the joint assembly is readily connected between the parts even though misaligned. This is due to the universal pivotal movement of the stud 20 relative to the socket housing 21. Because of the universal pivotal movement, sideloading on the bearing is minimized as compared to a joint in which no universal pivotal movement could occur. Sideloading would increase the rate of wear of the bearing surfaces and increase the forces required to rotate and to axially displace the stud with respect to the housing.

Further, in the joint of the present invention, the edge 50 at which the toroidal surface 46 terminates lies in a horizontal plane as viewed in the drawings. This plane is below, as viewed in FIG. 1, a parallel plane containing the pivot point 62. It should thus be obvious that the pivot point 62 is located between the toroidal surfaces 46 and 70.

The joint assembly 10 may be assembled in an effective and efficient manner. Specifically, the stud 20 may be inserted through the central opening 63 of the bearing 60. The bearing 60 and stud 20 can then be positioned in the chamber 40 in the socket housing 21. The bearing 70 may then be slipped over the stud member 20 and into the housing chamber 40. The washer 80 is then also slipped over the stud 20 and into the housing chamber 40. These parts are brought into abutting engagement. The housing member is then deformed in a mechanical deforming operation as is well known to those skilled in the art forming the shoulder 82. This assembly operation readily provides for assembly of the joint unit.

Having described my invention, I claim:

1. A joint assembly adapted to be connected between two relatively movable spaced parts, said joint assembly comprising a housing member and a stud member in assembled relation, said housing member having a portion for attachment to one of said relatively movable parts and defining a chamber, said stud member having a portion protruding from said chamber for attachment to the other of said relatively movable parts, means for supporting said stud member for rotation about its own axis relative to said housing for free axial movement relative to said housing, and for universal pivotal movement about a point on its axis relative to said housing, said means comprising a spherical bearing in said chamber and having a central passage through which said stud extends, said passage in said bearing being defined by an inner surface which conforms to and engages the outer surface of said stud, a stop portion on said stud for engaging said bearing to limit movement of said stud axially in a direction tending to separate said stud and housing, said stud being freely movable in an unrestrained manner axially relative to said bearing between a first position in which said stop engages said bearing and a second position spaced from said bearing, and means for holding said bearing against axial movement relative to said housing.

2. A joint assembly as defined in claim 1 wherein said chamber is defined in part by a first toroidal surface which engages said bearing, and said joint assembly further comprising a second bearing having a second toroidal surface spaced from said first toroidal surface and engaging said first mentioned bearing.

3. A joint assembly as defined in claim 2 wherein said pivot point on the axis of said stud is located between said first and second toroidal surfaces.

4. A joint assembly as defined in claim 3 wherein said stop portion of said stud comprises a flange extending radially from one end of said stud.

5. A joint assembly adapted to be connected between two relatively movable spaced parts, said joint assembly including first and second members in an assembled relation to be connected between said parts, said first member comprising a housing defining a chamber and having a portion for attachment to one of said relatively movable parts, said second member comprising a stud extending into said chamber and having a portion protruding from said chamber for attachment to the other of said relatively movable parts, a spherical bearing located in said chamber and supporting said stud for free rotational movement relative to said housing about the stud axis, said bearing further supporting said stud for unrestrained axial movement with respect to said bearing and housing to compensate for variation in the spacing between said parts, said bearing comprising a bearing member having a central passage through which said stud extends, said passage in said bearing being defined by an inner surface which conforms to and engages the outer surface of said stud, said bearing having an outer spherical surface for engaging spherical surface portions in said housing to enable said stud to pivot universally relative to said housing about a pivot point on said stud axis, a stop portion on said stud for engaging said bearing to limit movement of said stud axially in a direction tending to separate said stud and housing, said stud being freely movable in an unrestrained manner axially relative to said bearing between a first position in which said stop portion engages said bearing and a second position spaced from said bearing, and means for holding said bearing against axial movement relative to said housing.

6. A joint assembly as defined in claim 5 wherein said spherical surface portions comprise a first toroidal surface of said housing and a second toroidal surface of a second bearing located in said housing, said pivot point being located between said toroidal surfaces.

7. A joint assembly as defined in claim 5 wherein said means for holding said bearing against axial movement includes a second bearing located at one axial end of said first mentioned bearing, and said joint further including a shoulder on said housing and a washer interposed between said shoulder and said second bearing.

8. A joint assembly adapted to be connected between two relatively movable spaced parts, said joint assembly including first and second members in an assembled relation to be connected between said parts, said first member comprising a housing defining a chamber and having a portion for attachment to one of said relatively movable parts, said second member comprising a stud extending into said chamber and having a portion protruding from said chamber for attachment to the other of said relatively movable parts, a spherical bearing located in said chamber and supporting said stud for free rotational movement relative to said housing about the stud axis, said bearing further supporting said stud for unrestrained axial movement with respect to said bearing and housing to compensate for variation in the spacing between said parts, said bearing comprising a bearing member having a central passage through which said stud extends, said passage in said bearing being defined by an inner surface which conforms to and engages the outer surface of said stud, said bearing having an outer spherical surface for engaging spherical surface portions in said housing to enable said stud to pivot universally relative to said housing about a pivot point on said stud axis, a stop portion on said stud for engaging said bearing to limit movement of said stud axially in a direction tending to separate said stud and housing, said stud being freely movable in an unrestrained manner axially relative to said bearing between a first position in which said stop portion engages said bearing and a second position spaced from said bearing, and means for holding said bearing against axial movement relative to said housing, said means for holding said bearing against axial movement including a second bearing located at one axial end of said first mentioned bearing, and said joint further including a shoulder on said housing and a washer interposed between said shoulder and said second bearing, said washer and said second bearing having cylindrical outer peripheries, and are located in a cylindrical chamber portion of said housing, and said stop portion of said stud extends into another cylindrical portion of said housing chamber.

9. A joint assembly as defined in claim 8 wherein said first mentioned bearing is located in a toroidal shaped chamber portion located between said cylindrical chamber portions.

10. A joint assembly adapted to be connected between two relatively movable spaced parts, said joint assembly including first and second members in an assembled relation to be connected between said parts, said first member comprising a housing defining a chamber and having a portion for attachment to one of said relatively movable parts, said housing including a first arcuate bearing surface area which forms a portion of a sphere having a first diameter, said second member comprising a stud extending axially into said chamber and having a portion protruding axially outwardly from said chamber for attachment to the other of said relatively movable parts, a spherical bearing located in said chamber in abutting engagement with said first bearing surface area, said spherical bearing having a spherical outer side surface with a diameter which equal to said first diameter, said spherical bearing supporting said stud for free rotational movement relative to said housing about the stud axis, said spherical bearing further supporting said stud for unrestrained axial movement with respect to said spherical bearing and housing to compensate for variation in the spacing between said parts, said spherical bearing comprising a bearing member having a central passage through which said stud extends, said passage in said spherical bearing being defined by an inner surface which conforms to and engages the outer surface of said stud, said spherical bearing being rotatable relative to said first bearing surface area in any direction relative to the center of said spherical bearing to enable said stud to pivot universally relative to said housing about a pivot point on said stud axis, a stop portion on said stud for engaging said spherical bearing to limit movement of said stud axially in a direction tending to separate said stud and housing, said stud being freely movable in an unrestrained manner axially relative to said spherical bearing between a first position in which said stop portion engages said spherical bearing and a second position spaced from said spherical bearing, and means for holding said spherical bearing against axial movement relative to said housing, said means for holding said spherical bearing against axial movement including a second arcuate bearing surface area which forms a portion of a sphere having said first diameter, said second bearing surface area being disposed in an orientation facing toward said first arcuate bearing surface area and being disposed in abutting engagement with said spherical bearing.

11. A joint assembly as set forth in claim 10 wherein said housing includes a wall which is adapted to be fixedly connected with said one of said relatively movable parts, said first bearing surface area being formed by a portion of said housing wall.

12. A joint assembly as set forth in claim 10 wherein said stop portion of said stud is disposed in said chamber at a location inwardly of said first and second arcuate bearing surface areas.

* * * * *